US010388259B2

(12) United States Patent
Jayaraman (10) Patent No.: US 10,388,259 B2
(45) Date of Patent: *Aug. 20, 2019

(54) REMAPPING SOFTWARE ELEMENTS TO INCREASE THE USABILITY OF A DEVICE WITH A DAMAGED SCREEN

(71) Applicant: International Business Machines Corporation, Armonk, NY (US)

(72) Inventor: Prasanna Jayaraman, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/819,262

(22) Filed: Nov. 21, 2017

(65) Prior Publication Data
US 2018/0374455 A1 Dec. 27, 2018

Related U.S. Application Data

(63) Continuation of application No. 15/629,632, filed on Jun. 21, 2017.

(51) Int. Cl.
*G09G 5/38* (2006.01)
*G06F 3/041* (2006.01)
*G06F 3/0484* (2013.01)

(52) U.S. Cl.
CPC ............ *G09G 5/38* (2013.01); *G06F 3/0418* (2013.01); *G06F 3/04845* (2013.01); *G09G 2330/12* (2013.01); *G09G 2340/14* (2013.01)

(58) Field of Classification Search
None
See application file for complete search history.

(56) References Cited

U.S. PATENT DOCUMENTS

2008/0238936 A1* 10/2008 Kim ..................... G09G 3/3648
345/618
2014/0320437 A1* 10/2014 Kang ................... G09G 5/373
345/173

(Continued)

FOREIGN PATENT DOCUMENTS

WO WO-2016/061970 A1 4/2016
WO WO-2016/101605 A1 6/2016

OTHER PUBLICATIONS

U.S. Appl. No. 15/629,632, to Prasanna Jayaraman, entitled, *Remapping Software Elements to Increase the Usability of a Device with a Damaged Screen*, assigned to International Business Machines Corporation, 34 pages, filed Jun. 21, 2017.

(Continued)

*Primary Examiner* — Kyle Zhai
(74) *Attorney, Agent, or Firm* — Jason H. Sosa (57) ABSTRACT

Remapping software elements to increase the usability of a device with a damaged screen including receiving a request to transition the device with the damaged screen into damaged screen mode; dividing, by a remapping module, the damaged screen into a plurality of sectors; determining, by the remapping module, a usability of each of the plurality of sectors of the damaged screen; remapping, by the remapping module, elements of device software to sectors based on the usability of each of the plurality of sectors of the damaged screen; and presenting the remapped elements of the device software to a user of the device.

5 Claims, 8 Drawing Sheets

(56) References Cited

U.S. PATENT DOCUMENTS

| | | |
|---|---|---|
| 2015/0193074 A1 | 7/2015 | Cudak et al. |
| 2016/0085376 A1 | 3/2016 | Mabie et al. |
| 2016/0196098 A1* | 7/2016 | Roth ...................... B60K 35/00 715/761 |
| 2017/0315007 A1* | 11/2017 | Fitzgerald ................. G01L 5/22 |

OTHER PUBLICATIONS

Appendix P; List of IBM Patent or Applications Treated as Related, Nov. 15, 2017, 2 pages.

* cited by examiner

REMAPPING SOFTWARE ELEMENTS TO INCREASE THE USABILITY OF A DEVICE WITH A DAMAGED SCREEN

CROSS-REFERENCE TO RELATED APPLICATION

This application is a continuation application of U.S. patent application Ser. No. 15/629,632, filed Jun. 21, 2017.

BACKGROUND

Field of the Invention

The field of the invention is data processing, or, more specifically, methods, apparatus, and products for remapping software elements to increase the usability of a device with a damaged screen.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for remapping software elements to increase the usability of a device with a damaged screen are disclosed in this specification. Remapping software elements to increase the usability of a device with a damaged screen includes receiving a request to transition a device with a damaged screen into damaged screen mode; dividing, by a remapping module, the damaged screen into a plurality of sectors; determining, by the remapping module, a usability of each of the plurality of sectors of the damaged screen; remapping, by the remapping module, elements of device software to sectors based on the usability of each of the plurality of sectors of the damaged screen; and presenting the remapped elements of the device software to a user of the device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
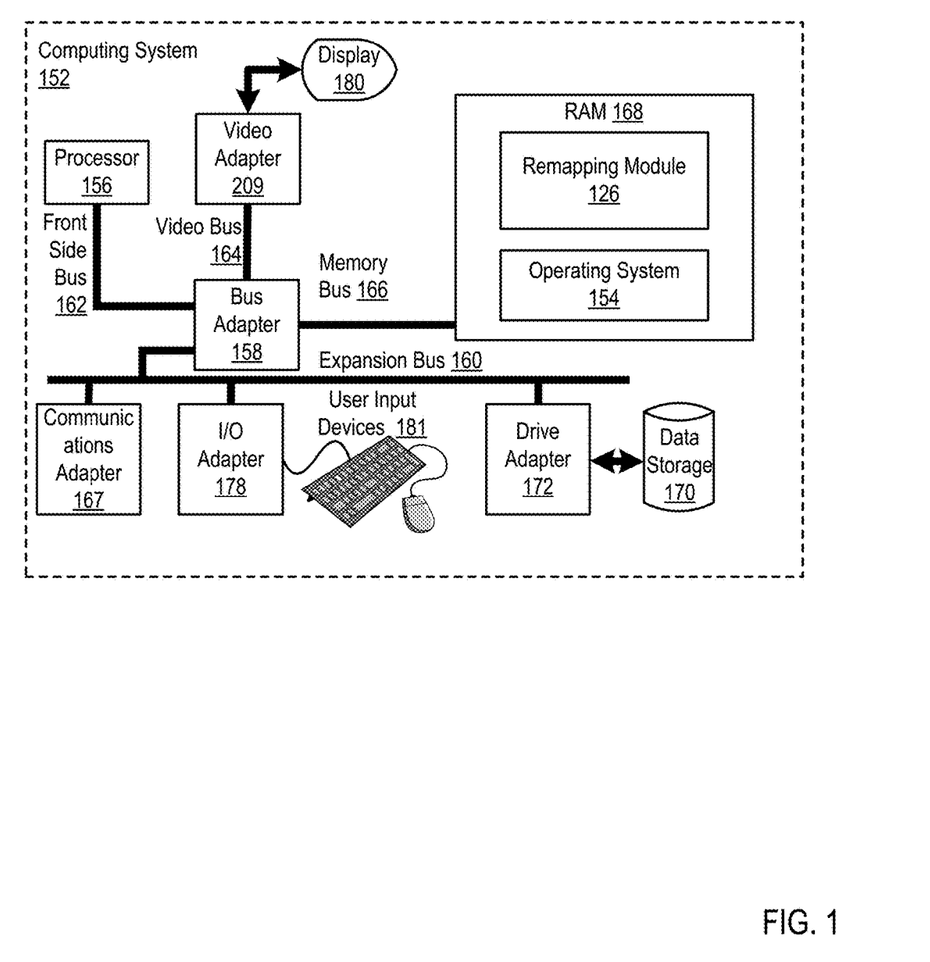
FIG. 1 sets forth a block diagram of an example system configured for remapping software elements to increase the usability of a device with a damaged screen according to embodiments of the present invention.

Exemplary methods, apparatus, and products for remapping software elements to increase the usability of a device with a damaged screen in accordance with the present invention are described with reference to the accompanying drawings, beginning with FIG. 1. FIG. 1 sets forth a block diagram of automated computing machinery comprising an exemplary computing system (152) configured for remapping software elements to increase the usability of a device with a damaged screen according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for remapping software elements to increase the usability of a device with a damaged screen according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) is a remapping module (126), a module of computer program instructions for remapping software elements to increase the usability of a device with a damaged screen.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for remapping software elements to increase the usability of a device with a damaged screen according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for remapping software elements to increase the usability of a device with a damaged screen according to embodiments of the present invention include modems for wired dial-up communications, Ethernet (IEEE 802.3) adapters for wired data communications, and 802.11 adapters for wireless data communications.

Figure 2:
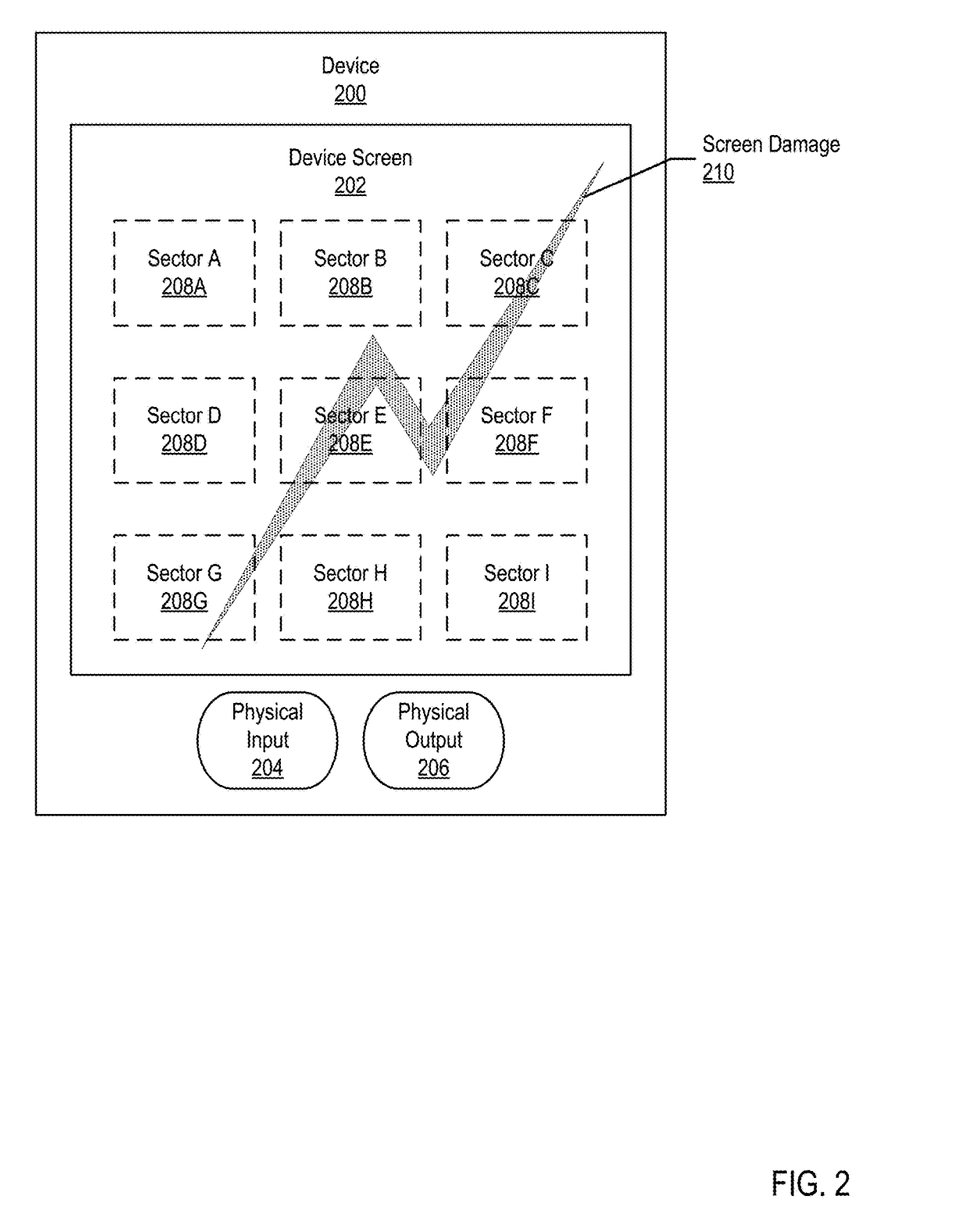
FIG. 2 sets forth an example block diagram configured for remapping software elements to increase the usability of a device with a damaged screen according to embodiments of the present invention.

FIG. 2 shows an example block diagram of a device configured for remapping software elements to increase the usability of a device with a damaged screen in accordance with the present invention. As shown in FIG. 2, the exemplary device (200) includes a device screen (202), physical input (204), and physical output (206). The device screen (202) has been damaged by screen damage (210). Also shown in FIG. 2, the device screen (202) has been divided into multiple sectors (sector A (208A), sector B (208B), sector C (208C), sector D (208D), sector E (208E), sector F (208F), sector G (208G), sector H (208H), sector I (208I)).

The device (200) is an electronic device that includes the device screen (202). The device (200) may be a computing device, such as laptop, smartphone, or tablet computer. The device (200) may be an output device (such as a computer monitor) or an input/output device (such as a touchscreen monitor). The device (200) may execute the remapping module. Alternatively, the remapping module may execute on another computing device operatively coupled to the device (200).

The device screen (202) may be a computer display with or without input capabilities. The device screen (202) shown in FIG. 2 includes screen damage (210). The screen damage (210) is a reduction in the normal operation of the device screen (202). The screen damage (210) may be irreversible (under normal conditions), such as a crack, chip, or other damage to the surface of the display. The screen damage (210) may be a reduction in the display functionality of the device screen (202) such as area that displays incorrectly (e.g., dead pixels). The screen damage (210) may be a reduction in the input functionality of the device screen (202), such as area that is unresponsive to touch input.

The physical input (204) is input that is not received via the device screen (202). The physical input (204) may be physical buttons on the device (200), such as a power button, volume button, or navigation buttons. The physical input (204) may be an audio input such as a microphone, or a photovoltaic input such as light sensor. The physical input (204) may be motion sensors of the device, such as an accelerometer. The physical output (206) is output that is not presented via the device screen (202). The physical output (206) may be an audio output, such as a speaker, or a motion output, such as a vibration motor.

Each sector (sector A (208A), sector B (208B), sector C (208C), sector D (208D), sector E (208E), sector F (208F), sector G (208G), sector H (208H), sector I (208I)) is a portion of the device screen (202) as divided by the remapping module. Each sector is a virtual portion of the device screen (202) used for testing independent of the other sectors. Although nine sectors are shown in FIG. 2, the remapping module may divide the device screen (202) into any number of sectors. As shown in the example block diagram of FIG. 2, the screen damage (210) affects sector C (208C), sector E (208E), sector F (208F), and sector G (208G), but does not affect sector A (208A), sector B (208B), sector D (208D), sector H (208H), or sector I (208I).

Figure 3:
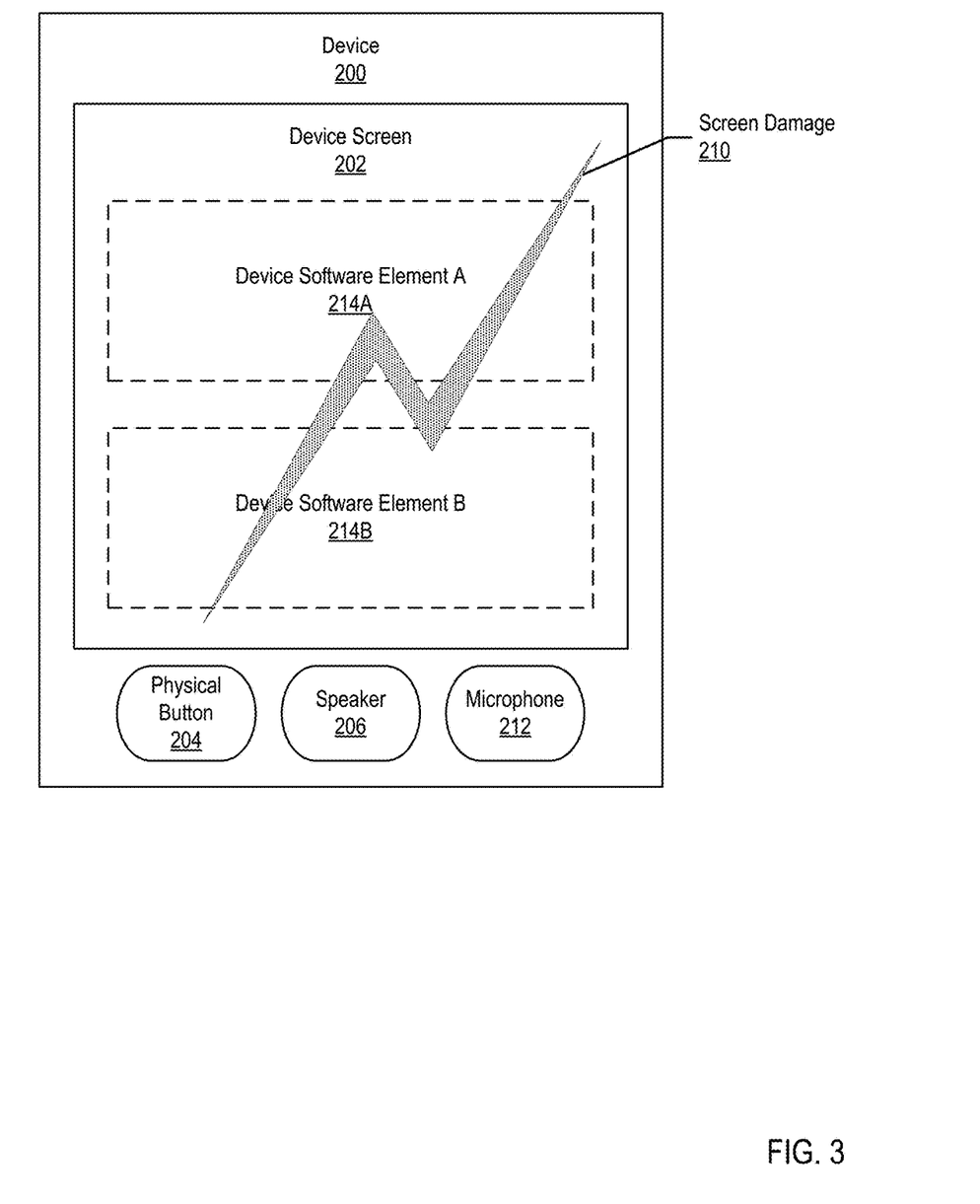
FIG. 3 sets forth an example block diagram configured for remapping software elements to increase the usability of a device with a damaged screen according to embodiments of the present invention.

FIG. 3 shows an example block diagram of a device configured for remapping software elements to increase the usability of a device with a damaged screen in accordance with the present invention. Specifically, FIG. 3 shows an example block diagram of a device (200) prior to remapping the device software elements (device software element A (214A), device software element B (214B)). As shown in FIG. 3, the exemplary device (200) includes a device screen (202) with screen damage (210). The screen damage affects device software element A (214A) and device software element B (214B). The device (200) also includes a physical button (204), a speaker (206), and a microphone (212). The sectors used by the remapping module to divide and test the device screen (202) are not shown in FIG. 3 or 4.

The device software elements (device software element A (214A) and device software element B (214B)) are input and/or output modules of a computer program or operating system. The device software elements may be input elements, output elements, or both. An input device software element may be an element used to detect input from a user of the device (200). An output device software element may be an element used to present information to the user of the device (200). For example, a touchscreen keyboard displayed on the device screen (202) may include two device software elements—an output element displaying the keyboard, and an input element that listens for touch inputs on the touchscreen keyboard. As another example, text displayed on the device screen (202) may include multiple device software elements—a font element describing the font of the text, a style element describing the presentation of the text (e.g., size, bold, italic, underline), and a content element describing the text data.

Figure 4:
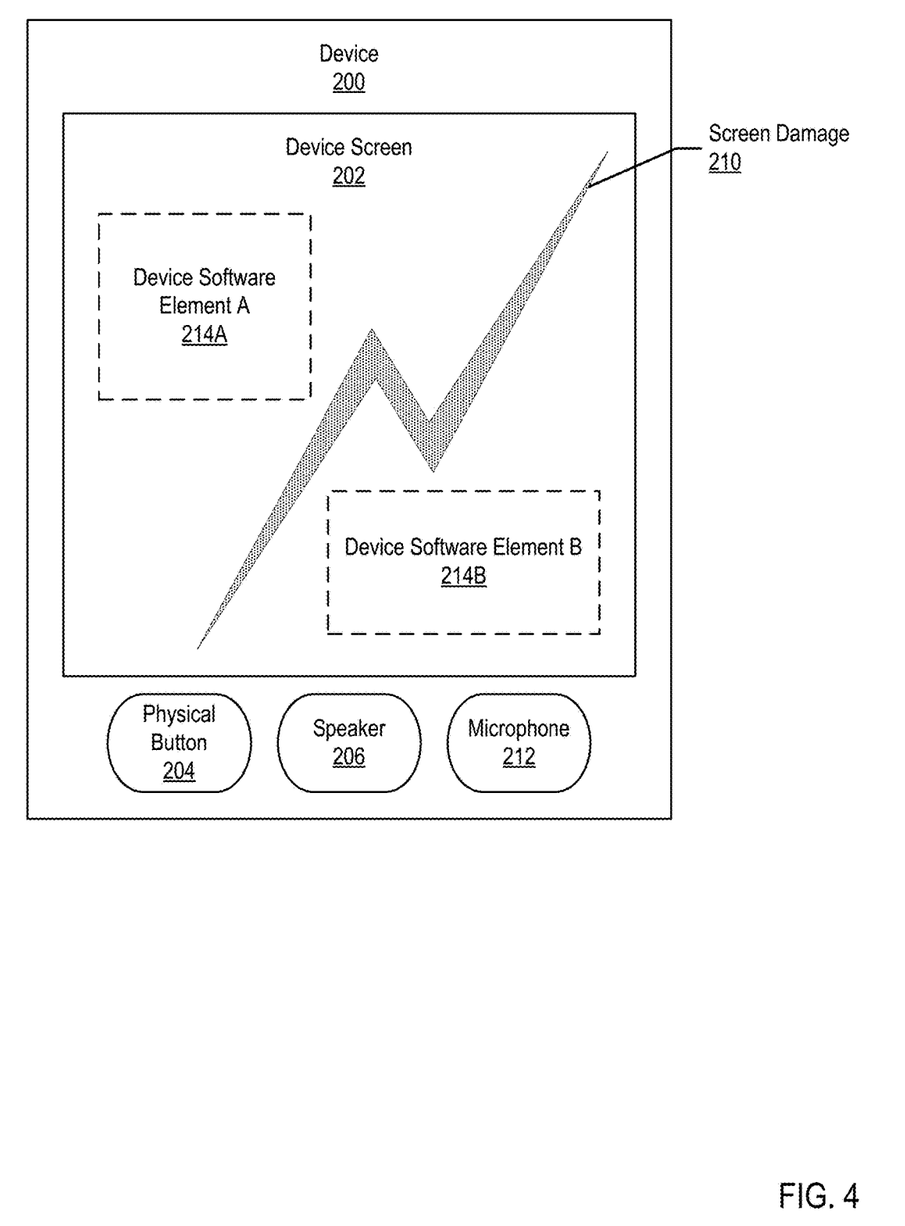
FIG. 4 sets forth an example block diagram configured for remapping software elements to increase the usability of a device with a damaged screen according to embodiments of the present invention.

FIG. 4 shows elements of an example block diagram of a device configured for remapping software elements to increase the usability of a device with a damaged screen in accordance with the present invention. Prior to result shown in FIG. 4, the remapping module receives a request to transition the device (200) with a damaged screen (202) into damaged screen mode; divides the damaged screen (202) into a plurality of sectors; determines a usability of each of the plurality of sectors of the damaged screen (202); remaps elements of device software (device software element A (214A) and device software element B (214B)) to sectors based on the usability of each of the plurality of sectors of the damaged screen (202); and presents the remapped elements of the device software (device software element A (214A) and device software element B (214B)) to a user of the device (200). As shown in FIG. 4, the device software elements (device software element A (214A) and device software element B (214B)) have been remapped to sections of the device screen (202) that are unaffected by the screen damage (210).

Figure 5:
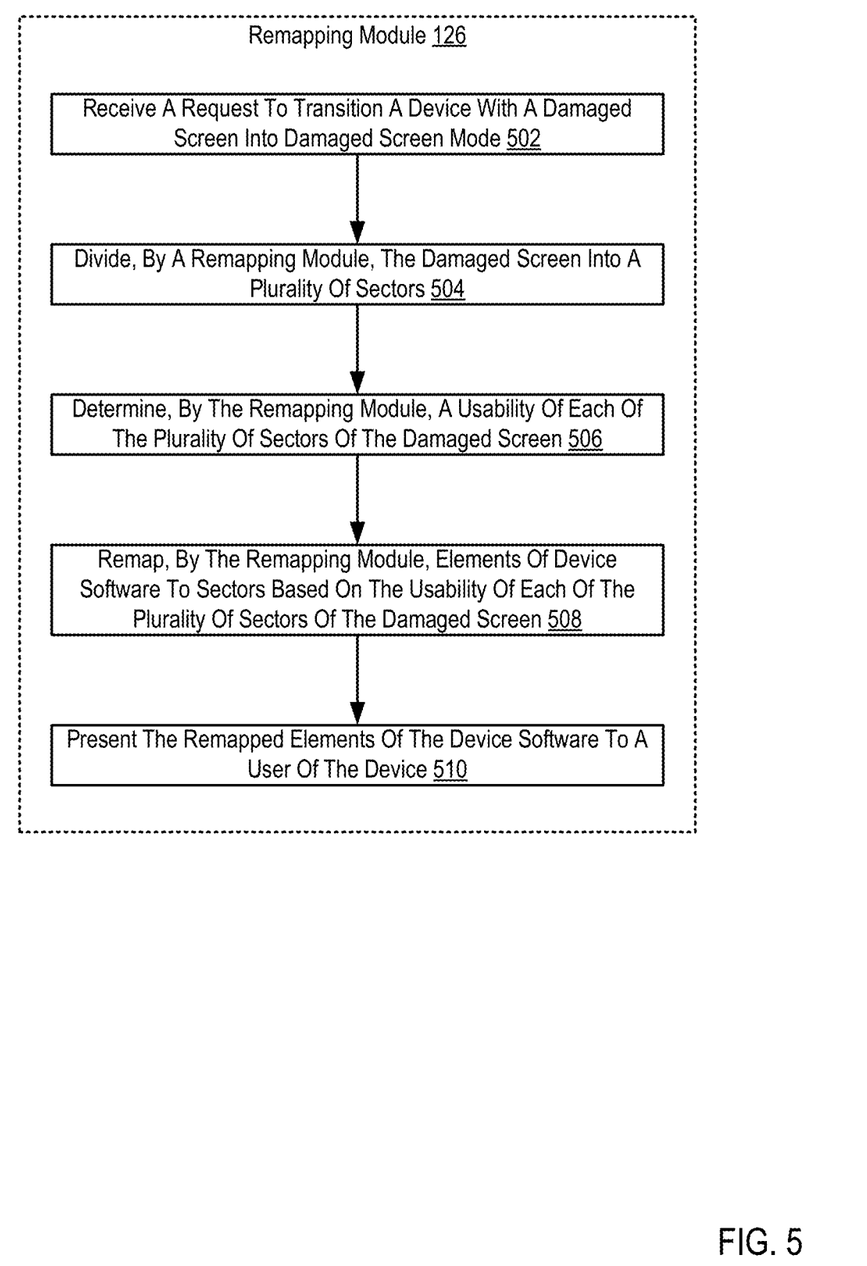
FIG. 5 sets forth a flow chart illustrating an exemplary method for remapping software elements to increase the usability of a device with a damaged screen according to embodiments of the present invention.

For further explanation, FIG. 5 sets forth a flow chart illustrating an exemplary method for remapping software elements to increase the usability of a device with a damaged screen according to embodiments of the present invention that includes receiving (502) a request to transition a device with a damaged screen into damaged screen mode. Receiving (502) a request to transition a device with a damaged screen into damaged screen mode may be carried out by submitting a combination of inputs to the device in order to initiate the transition into damaged screen mode (e.g., if the remapping module is executing on the device with the damaged screen). The request may also be sent to a computing system operatively coupled to the device and hosting the remapping module. The remapping module may be computer hardware, computer software, or an aggregation of both computer hardware and computer software.

The damaged screen mode may refer to an operational mode of the device in which device software elements are remapped to usable sectors of the device screen. Transitioning a device into a damage screen mode may include steps 504, 506, and 508 as discussed below. Once transitioned into a damaged screen mode, the device may operate using the remapped device software elements until the device is transitioned out of the damages screen mode or the damaged screen mode is exited.

The method of FIG. 5 also includes dividing (504), by a remapping module (126), the damaged screen into a plurality of sectors. Dividing (504), by a remapping module (126), the damaged screen into a plurality of sectors may be carried out by retrieving information about the screen, such as screen size (e.g., pixel width, pixel density), capabilities (e.g., output only, touchscreen, input only), and type (e.g., manufacturer, model number). The number of sectors may depend upon the size, capability, and type of device.

The remapping module (126) may divide the damaged screen into sectors based on a grid with each square of the grid representing a sector. Alternatively, the remapping module (126) may identify an area or areas of the damaged screen to use as sectors (e.g., an area at the top of the screen and an area at the bottom of the screen). Further, areas of the damaged screen may be excluded from the division of sectors. For example, portions of a damaged screen that wrap around the side of the device may be excluded from the division of sectors.

The remapping module may utilize a data structure to store data describing each sector in the plurality of sectors. Each element in the data structure may correspond to a sector of the damaged screen. Each element may include data describing the corresponding sector, such as the usability of the sector.

The method of FIG. 5 also includes determining (506), by the remapping module (126), a usability of each of the plurality of sectors of the damaged screen. Determining (506), by the remapping module (126), a usability of each of the plurality of sectors of the damaged screen may be carried out by the remapping module obtaining data describing each sector and categorizing the usability of the sector based on the obtained data. The results of the determination may be stored in a data structure for the corresponding sector.

Usability refers to current functionality of the sector of the damaged screen in terms of input capability and output capability. Usability may include a binary data point for input and output (e.g., input is functional, output is not functional). Usability may include more detailed analysis of functionality. Specifically, the usability of a sector may describe a range of input and output abilities of the sector. For example, the usability of a sector may describe the input as functionally able to detect a touch input, but unable to distinguish between a brief touch and a long touch. As another example, the usability of a sector may describe the output as functionally able to display blue and green, but unable to display red and yellow.

Determining (506), by the remapping module (126), the usability of each of the plurality of sectors of the damaged screen may be carried out by automatically, without user intervention, retrieving usability information for each sector of the damaged screen. The remapping module may interact with the damaged screen in order to retrieve usability information about each sector. The remapping module may query the damaged screen and receive responses. Based on the responses to the sent messages, the remapping module may determine or infer the functionality of each sector.

Determining (506), by the remapping module (126), the usability of each of the plurality of sectors of the damaged screen may be carried out via interaction with a user. The remapping module may present the user with instructions in order to test the usability of each sector. For example, the remapping module may ask the user to touch an area of the screen corresponding to the sector under test, and the remapping module may determine whether the device is able to detect the user's touch. As another example, the remapping module may display a word on an area of the screen corresponding to a sector and ask the user if the user is able to read the word. The interaction with the user may be accomplished via a computing system operatively coupled to the device. Alternatively, the interaction may be accomplished using functional input and output of the device, such as a speaker and microphone.

The method of FIG. 5 also includes remapping (508), by the remapping module (126), elements of device software to sectors based on the usability of each of the plurality of sectors of the damaged screen. Remapping (508), by the remapping module (126), elements of device software to sectors based on the usability of each of the plurality of sectors of the damaged screen may be carried out by relocating at least one element of the device software to one or more usable sectors based on the determined usability of each of the plurality of sectors of the damaged screen; and removing at least one non-essential graphic element from the elements of the device software.

Remapping (508), by the remapping module (126), elements of device software to sectors based on the usability of each of the plurality of sectors of the damaged screen may also be carried out by remapping elements of the device software to physical inputs and outputs of the device. For example, a call accept button previously mapped to a location on a touchscreen of the device may be remapped to a physical volume button on the device. As another example, the accelerometer may be used as a physical input device to accept or end a phone call.

Remapping (508), by the remapping module (126), elements of device software to sectors based on the usability of each of the plurality of sectors of the damaged screen may also be carried out by presenting a user with different options for remapping functions of the device. The user may be presented with an element of the device software or device function and a menu of usable sectors of the damaged screen, physical inputs, and physical outputs of the device. The user may then map the element or device function to one or more sectors, physical inputs, or physical outputs of the device.

The method of FIG. 5 also includes presenting (510) the remapped elements of the device software to a user of the device. Presenting (510) the remapped elements of the device software to a user of the device may be carried out by implementing the remapped elements of the device software into the operation of the computer application or operating system. Presenting (510) the remapped elements of the device software to a user of the device may be carried out by altering the graphical user interface of the computer application or operating system based on the remapped device software elements.

Presenting (510) the remapped elements of the device software to a user of the device may be carried out by sending, by the computing system hosting the remapping module, a configuration file to the device software. The configuration file may include instructions for remapping the elements of the device software. The device may use the configuration file to alter the graphical user interface of the computer application or operating system to implement the remapped elements of the device software.

Figure 6:
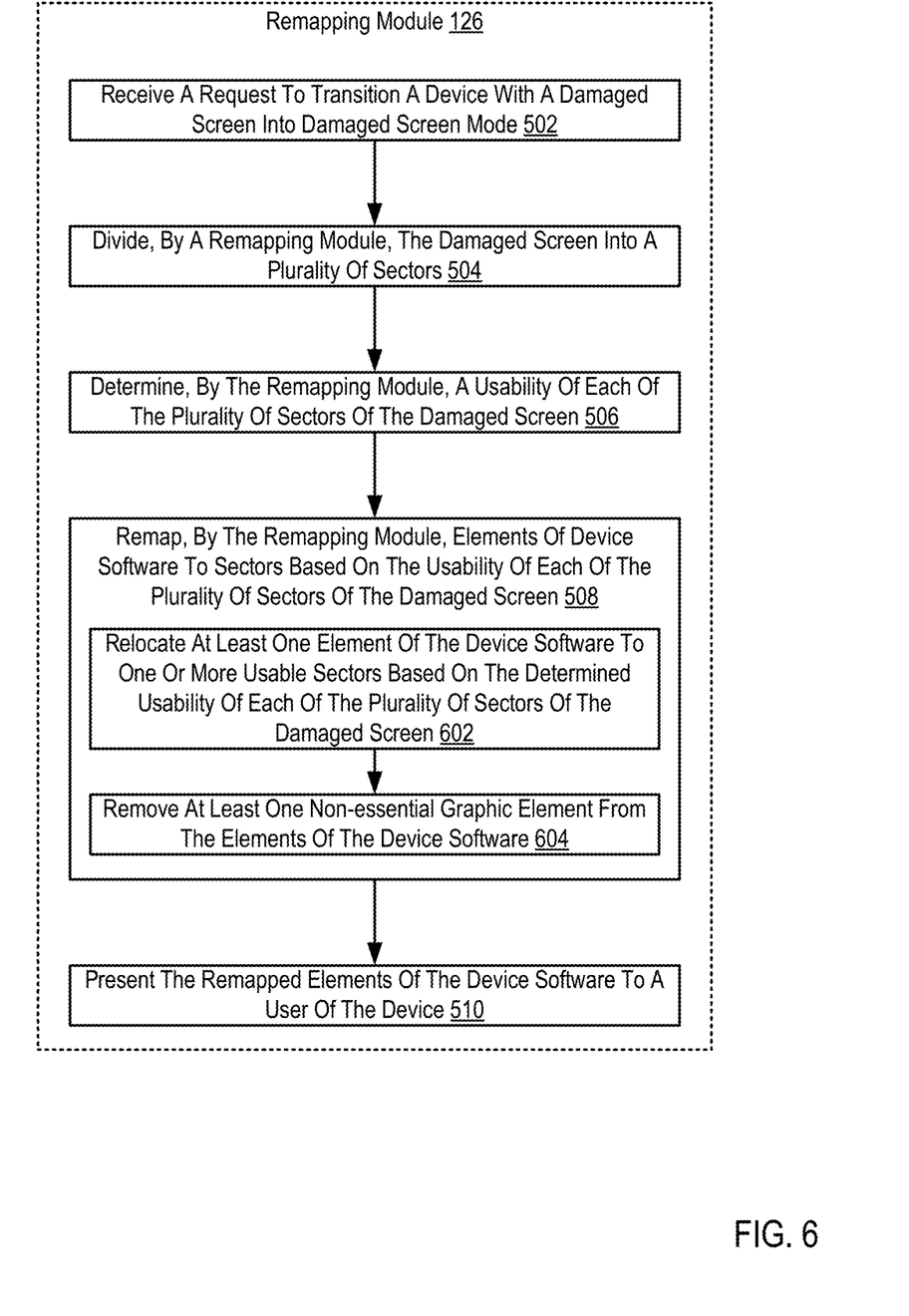
FIG. 6 sets forth a flow chart illustrating an exemplary method for remapping software elements to increase the usability of a device with a damaged screen according to embodiments of the present invention.

For further explanation, FIG. 6 sets forth a flow chart illustrating a further exemplary method for remapping software elements to increase the usability of a device with a damaged screen according to embodiments of the present invention that includes receiving (502) a request to transition a device with a damaged screen into damaged screen mode; dividing (504), by a remapping module (126), the damaged screen into a plurality of sectors; determining (506), by the remapping module (126), a usability of each of the plurality of sectors of the damaged screen; remapping (508), by the remapping module (126), elements of device software to sectors based on the usability of each of the plurality of sectors of the damaged screen; and presenting (510) the remapped elements of the device software to a user of the device.

The method of FIG. 6 differs from the method of FIG. 5, however, in that remapping (508), by the remapping module (126), elements of device software to sectors based on the usability of each of the plurality of sectors of the damaged screen includes relocating (602) at least one element of the device software to one or more usable sectors based on the determined usability of each of the plurality of sectors of the damaged screen; and removing (604) at least one non-essential graphic element from the elements of the device software.

Relocating (602) at least one element of the device software to one or more usable sectors based on the determined usability of each of the plurality of sectors of the damaged screen may be carried out by altering elements of the graphical user interface such that elements of the device software located in an unusable sector (for the purposes of the specific element of the device software) are moved to a usable sector. Relocating (602) at least one element of the device software to one or more usable sectors based on the determined usability of each of the plurality of sectors of the damaged screen may also be carried out by evaluating the usability of each of the plurality of sectors and matching each usable sector to one or more elements of the device software. For example, an element of the device software that is used only or primarily for output (e.g., a chat window) may be relocated to a sector that maintains output usability, but may have lost input usability.

The graphical user interface of the device software (made up of the elements of the device software) may be reconfigured based on the usability of each of the plurality of sectors of the damaged screen. Reconfiguring the elements of the device software may include altering one or more elements of the device software. For example, elements of the device software may be scaled up or down to accommodate the usability of the target sectors to which the element will be relocated.

Removing (604) at least one non-essential graphic element from the elements of the device software may be carried out by determining a subset of elements of the device software that are necessary for basic functionality of the device software and determining a subset of elements of the device software that are unnecessary for basic functionality of the device software. The remapping module may remap the subset of elements that are necessary for basic functionality of the device software, and exclude from remapping the subset of elements of the device software that are unnecessary for basic functionality of the device software.

For example, the remapping module may identify a text display that include visual flourishes in the device software. The remapping module may remove the visual flourishes from the text display, and relocate only the text display to a usable sector of the device screen.

Remapping (508), by the remapping module (126), elements of device software to sectors based on the usability of each of the plurality of sectors of the damaged screen may be carried out by generating a configuration file describing the reconfiguration of elements of the device software into the usable sectors of the device screen. The configuration file may be sent to the device software from the remapping module, either locally on the device or from a computing system operatively coupled to the device.

Figure 7:
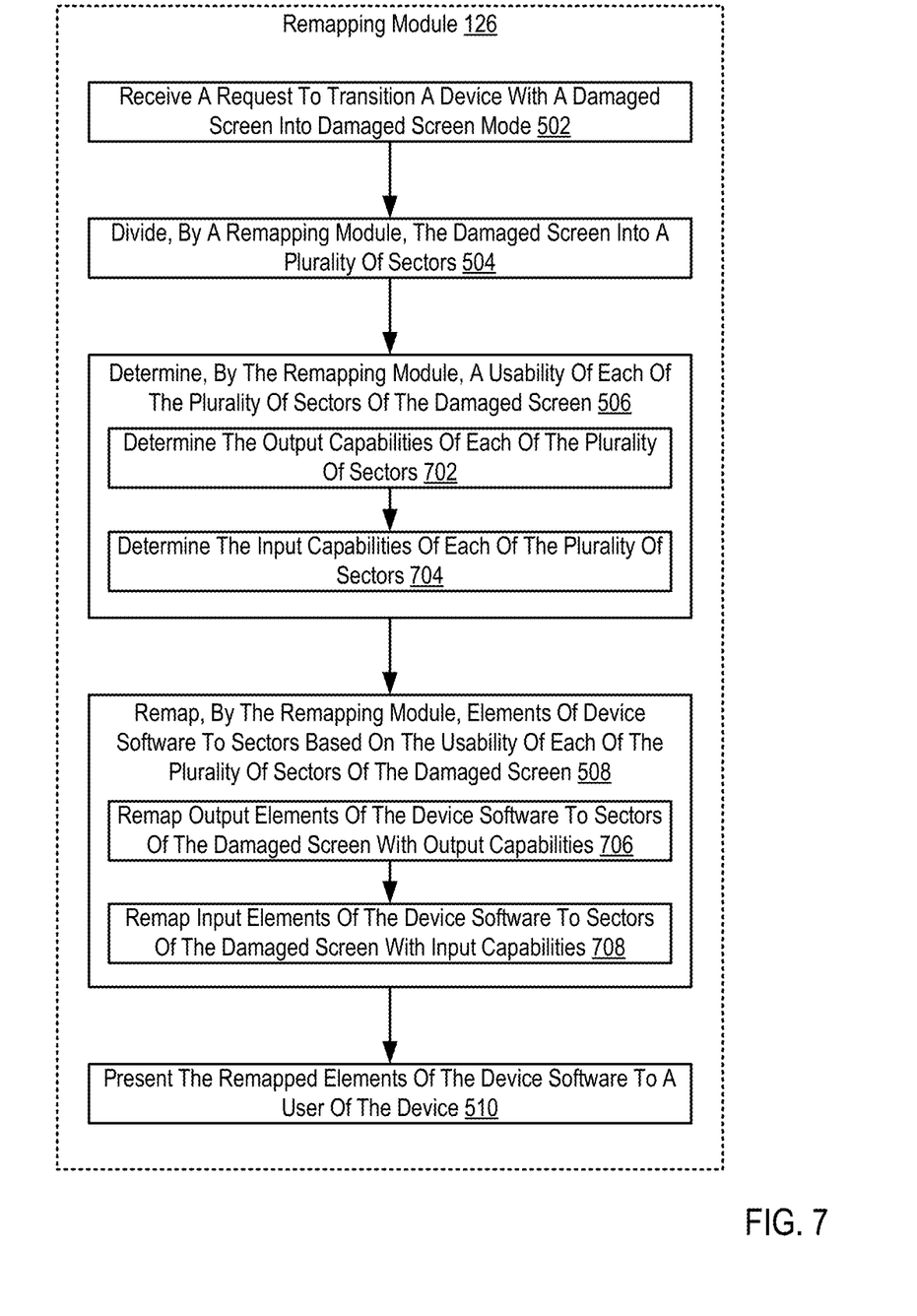
FIG. 7 sets forth a flow chart illustrating an exemplary method for remapping software elements to increase the usability of a device with a damaged screen according to embodiments of the present invention.

For further explanation, FIG. 7 sets forth a flow chart illustrating a further exemplary method for remapping software elements to increase the usability of a device with a damaged screen according to embodiments of the present invention that includes receiving (502) a request to transition a device with a damaged screen into damaged screen mode; dividing (504), by a remapping module (126), the damaged screen into a plurality of sectors; determining (506), by the remapping module (126), a usability of each of the plurality of sectors of the damaged screen; remapping (508), by the remapping module (126), elements of device software to sectors based on the usability of each of the plurality of sectors of the damaged screen; and presenting (510) the remapped elements of the device software to a user of the device.

The method of FIG. 7 differs from the method of FIG. 5, however, in that determining (506), by the remapping module (126), a usability of each of the plurality of sectors of the damaged screen includes determining (702) the output capabilities of each of the plurality of sectors; and determining (704) the input capabilities of each of the plurality of sectors. Determining (702) the output capabilities of each of the plurality of sectors and determining (704) the input capabilities of each of the plurality of sectors may be carried out by testing the input capabilities separately from the output capabilities. These determinations allow the remapping module to categorize each sector as having input capabilities, output capabilities, or both input and output capabilities. The input and/or output capabilities of each sector may be stored in a data structure.

The method of FIG. 7 also differs from the method of FIG. 5 in that remapping (508), by the remapping module (126), elements of device software to sectors based on the usability of each of the plurality of sectors of the damaged screen includes remapping (706) output elements of the device software to sectors of the damaged screen with output capabilities; and remapping (708) input elements of the device software to sectors of the damaged screen with input capabilities. Remapping (706) output elements of the device software to sectors of the damaged screen with output capabilities and remapping (708) input elements of the device software to sectors of the damaged screen with input capabilities may be carried out by determining the requirements of each necessary elements of the device software and matching the necessary elements to the sector or sectors that meet those requirements. Elements of the device software that require only input capabilities may be remapped to a sector with at least input capabilities. Similarly, elements of the device software that require only output capabilities may be remapped to a sector with at least output capabilities.

For example, a chat window may require only output capabilities and may therefore be remapped to a sector or sectors that include output usability. As another example, an onscreen keyboard may require both input and output capabilities and may therefore be remapped to a sector or sectors that include both input and output capabilities.

Figure 8:
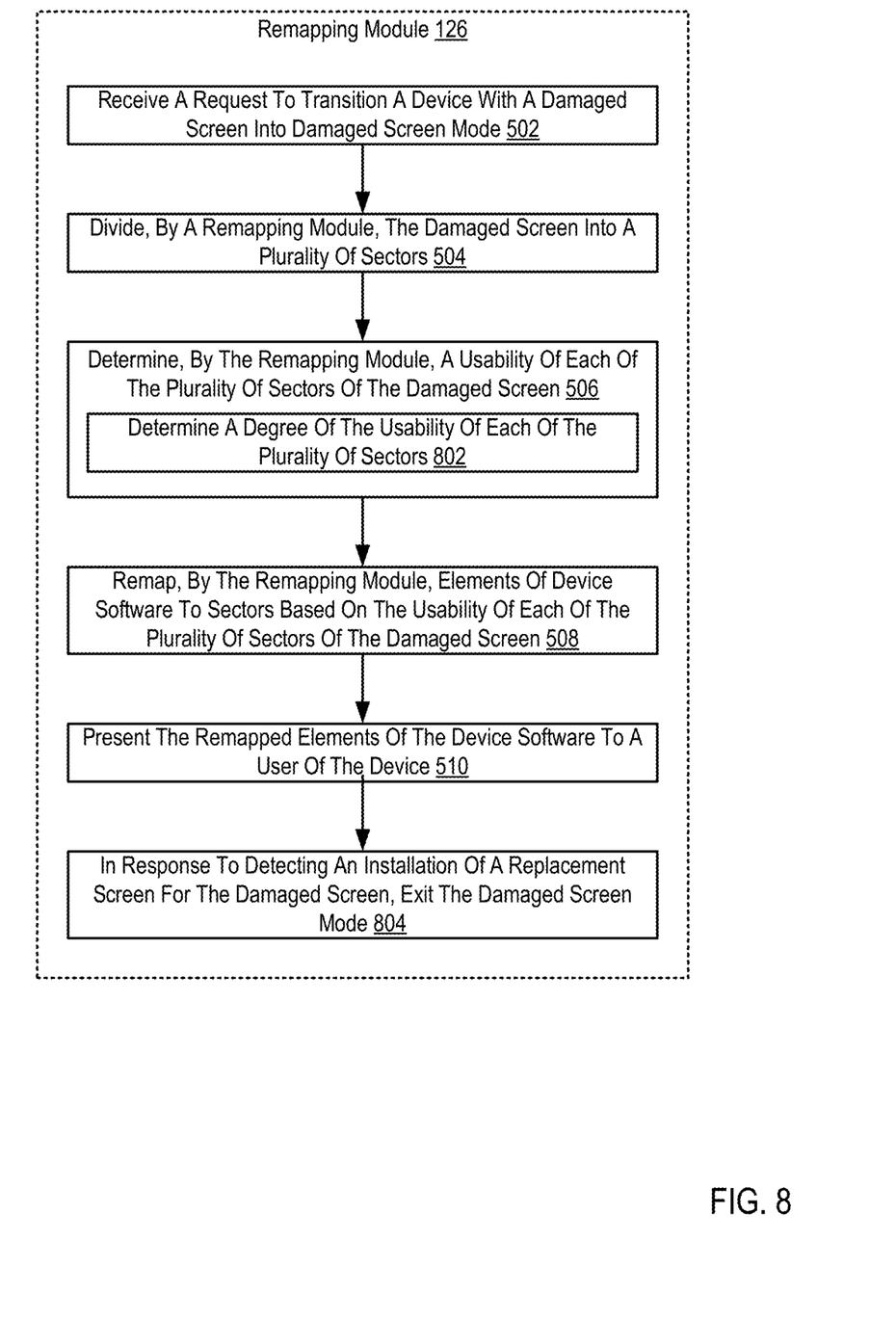
FIG. 8 sets forth a flow chart illustrating an exemplary method for remapping software elements to increase the usability of a device with a damaged screen according to embodiments of the present invention.

For further explanation, FIG. 8 sets forth a flow chart illustrating a further exemplary method for remapping software elements to increase the usability of a device with a damaged screen according to embodiments of the present invention that includes receiving (502) a request to transition a device with a damaged screen into damaged screen mode; dividing (504), by a remapping module (126), the damaged screen into a plurality of sectors; determining (506), by the remapping module (126), a usability of each of the plurality of sectors of the damaged screen; remapping (508), by the remapping module (126), elements of device software to sectors based on the usability of each of the plurality of sectors of the damaged screen; and presenting (510) the remapped elements of the device software to a user of the device.

The method of FIG. 8 differs from the method of FIG. 5, however, in that determining (506), by the remapping module (126), a usability of each of the plurality of sectors of the damaged screen includes determining (802) a degree of the usability of each of the plurality of sectors. Determining (802) a degree of the usability of each of the plurality of sectors may be carried out by obtaining diagnostic information about each of the plurality of sectors to determine a level of input and output usability for each of the plurality of sectors. Determining (802) a degree of the usability of each of the plurality of sectors may also be carried out by instructing a user of the device to interact with the sector to determine a level of usability associated with each sector.

The degree of usability for a device screen input may include the accuracy with which the sector detects a touch input, whether the sector is able to distinguish between a short and long touch, whether the sector is able to distinguish between a light touch and a forceful touch, and whether the sector is able to accurately trace the movement of a touch across the sector. The degree of usability for a device screen output may include the accuracy of colors presented on the sector, the brightness of the images presented on the sector, and the readability of text presented on the sector.

The method of FIG. 8 also differs from the method of FIG. 5 in that the method of FIG. 8 further includes in response to detecting an installation of a replacement screen for the damaged screen, exiting (804) the damaged screen mode. Detecting an installation of a replacement screen for the damaged screen may be carried out by monitoring the connection between the device screen and the device to determine whether the connection has been severed, and a connection to a different device screen has been made.

Exiting (804) the damaged screen mode may be carried out by returning the elements of the device software to the default mappings. The remapping module may send a message to the device software to discard the remapping of the elements and return to a standard or default mapping for each element of the device software remapped by the remapping module.

In view of the explanations set forth above, readers will recognize that the benefits of remapping software elements to increase the usability of a device with a damaged screen according to embodiments of the present invention include:

Improving the operation of a computing system by remapping elements of device software to sectors based on the usability of each sector, allowing a user to operate a damaged device.

Improving the usability of a damaged device by remapping necessary elements of the device software to sectors of the device screen unaffected or less affected by the screen damage.

Exemplary embodiments of the present invention are described largely in the context of a fully functional computer system for remapping software elements to increase the usability of a device with a damaged screen. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of remapping software elements to increase the usability of a device with a damaged screen, the method comprising:
receiving a request to transition the device with the damaged screen into damaged screen mode;
dividing, by a remapping module, the damaged screen into a plurality of sectors;
determining, by the remapping module, a usability of each of the plurality of sectors of the damaged screen, wherein determining the usability of each of the plurality of sectors of the damaged screen comprises:
  determining a degree of the usability of input capabilities and output capabilities of each of the plurality of sectors by instructing a user of the damaged screen to interact with the sector,
  categorizing each sector as having input capabilities only, output capabilities only, or both input and output capabilities, and
  storing the categorization of each sector in a data structure;
remapping, by the remapping module, elements of device software to sectors based on the usability of each of the plurality of sectors of the damaged screen, wherein remapping the elements of the device software to sectors based on the usability of each of the plurality of sectors of the damaged screen comprises:
  removing at least one non-essential graphic element from the elements of the device software including determining that the at least one non-essential graphic element is unnecessary for basic functionality of the device software and excluding from remapping the at least one non-essential graphic element,
  determining input requirements and output requirements of necessary elements of the device software, and
  remapping the necessary elements to sectors in accordance with the stored categorization of each sector; and
presenting the remapped elements of the device software to a user of the device.

2. The method of claim 1, wherein remapping the elements of the device software to sectors based on the usability of each of the plurality of sectors comprises:
  relocating at least one element of the device software to one or more usable sectors based on the determined usability of each of the plurality of sectors of the damaged screen.

3. The method of claim 1,
wherein determining the usability of each of the plurality of sectors of the damaged screen comprises determining the output capabilities of each of the plurality of sectors; and
remapping the elements of the device software to sectors based on the usability of each of the plurality of sectors of the damaged screen comprises remapping output elements of the device software to sectors of the damaged screen with output capabilities.

4. The method of claim 1,
wherein determining the usability of each of the plurality of sectors of the damaged screen comprises determining the input capabilities of each of the plurality of sectors; and
remapping the elements of the device software to sectors based on the usability of each of the plurality of sectors of the damaged screen comprises remapping input elements of the device software to sectors of the damaged screen with input capabilities.

5. The method of claim 1, further comprising:
in response to detecting an installation of a replacement screen for the damaged screen, exiting the damaged screen mode.

* * * * *